United States Patent Office 3,312,647
Patented Apr. 4, 1967

3,312,647
VINYL POLYMER WITH BASIC COMPLEX LEAD COMPOUND
Alfred Szczepanek and Margarete Szczepanek, nee Schnoor, Niederau uber Duren, Rhineland, Germany, assignors to Chemische Fabrik Hoesch K.G., Duren, Germany, a company of Germany
No Drawing. Filed Oct. 29, 1962, Ser. No. 233,898
Claims priority, application Germany, Dec. 22, 1955, C 12,311
3 Claims. (Cl. 260—23)

The present application is a continuation-in-part of copending application Ser. No. 629,461, filed December 20, 1956, and entitled, "Basic Complex Lead Compounds," now Patent No. 3,072,693.

The present invention relates to compositions containing complex lead compounds as pigments and/or stabilizers especially for halogen containing plastics, and to a process of making such compositions.

It is one object of the present invention to provide new and valuable compositions which contain specific complex lead compounds which have proved to be of value as pigments and/or as stabilizers for halogen-containing plastics.

Another object of the present invention is to provide a simple and effective process of preparing such new and valuable compositions.

Other objects of the present invention and advantageous features thereof will become apparent as the invention proceeds.

In principle the new complex lead compounds contained in such compositions according to the present invention correspond to the following formula $$nPbO \cdot PbAc_1 \cdot mPb(Ac_2)_x$$

In said formula $n$ indicates the numerals 0 to 16;
$m$ indicates the numerals 0.5 to 4;
$Ac_1$ indicates an inorganic dibasic acid residue, namely $>SO_4$, $>CO_3$, and $>HPO_3$;
$Ac_2$ indicates an organic saturated or unsaturated monobasic aliphatic acid, residue such as stearic acid, lauric acid, ethyl hexanoic acid; a saturated or unsaturated dibasic aliphatic acid, such as adipic acid; a monobasic aromatic acid, such as benzoic acid or salicylic acid; or a dibasic aromatic acid such as phthalic acid; and
$x$ indicates the numeral 1 when $Ac_2$ is a dibasic acid and the numeral 2 when $Ac_2$ is a monobasic acid.

Such basic complex lead salts are prdouced according to said copending application Ser. No. 629,461 by reacting basic inorganic lead salts with organic acids to form complex compounds. Especially suitable inorganic lead salts are tetrabasic lead sulfate, basic lead carbonate, and dibasic lead phosphite. Suitable organic acids used for this reaction are saturated and unsaturated mono- and dicarboxylic acids of the aliphatic and aromatic series such as, for instance, stearic acid, oleic acid, linoleic acid, maleic acid, α-ethyl hexanoic acid, adipic acid, benzoic acid, phthalic acid, lauric acid, fatty acids obtained on splitting coconut oil, ricinoleic acid, and the like. Such organic acids are used for the reaction with basic inorganic lead salts, either as such, or in mixture with each other. The reaction products with saturated and unsaturated fatty acids represent especially valuable stabilizers for processing polyvinyl chloride plastics because they impart to the basic inorganic lead compounds excellent sliding and lubricating properties.

Said process may be modified by causing the resulting basic complex lead compounds to react with additional amount of lead oxide. As a result thereof the heat-stabilizing lead content of the complex compound is increased. The above characterized complex lead compounds can be produced according to the following principal methods whereby the process may be carried out in the presence or in the absence of a catalyst:

(a) Reaction of the inorganic lead salts with water-insoluble organic acid:
  (1) The organic acid is dispersed in flake form together with a catalyst in water at elevated temperature and the basic inorganic lead salt is added portion by portion to the dispersion.
  (2) The basic inorganic lead salt is dispersed in water together with a catalyst and the flaky organic acid is added thereto portion by portion.
  (3) The basic inorganic lead salt is dispersed in water and the molten organic acid is added to the dispersion while stirring.
  (4) The basic inorganic lead salt and the pulverulent or flaky fatty acid are stirred without catalyst at elevated temperature for a prolonged period of time.
  (5) Lead oxide and the inorganic acid are reacted to form the basic lead salt and the organic acid and, if desired, a catalyst, are added to the reaction mixture.

(b) Reaction of the inorganic lead salts with water-soluble organic acids:
  (1) An aqueous solution of the organic acid is added to a dispersion of the basic inorganic lead salt in water.
  (2) The basic inorganic lead salt is dispersed in water, if desired, together with the catalyst and the organic acid is added to the dispersion.

(c) The basic lead salt is first produced and is subsequently reacted with lead oxide with or without the addition of a catalyst and air is passed through the reaction mixture in order to produce a white reaction product and to introduce the maximum amount of lead oxide.

It is also possible to produce normal as well as higher basic complex lead compounds by starting with the individual components of such complex compounds, namely inorganic acid, lead oxide, and organic acid. It is, however, advisable to proceed in such a manner that microcrystalline products are obtained, since the size of the surface area determines the usefulness of the basic complex compound as pigment and stabilizer.

The reactants are reacted with each other in stoichiometrical amounts. Since in almost all instances the resulting reaction products are insoluble, the yield is substantially quantitative. The reaction may be carried out at room temperature or at elevated temperature. Elevated temperature accelerates the reaction. The upper temperature limit is given by the melting point of the organic acid if it is insoluble in water. When using water-soluble acids, the temperature can be increased to the boiling temperature of water.

The amount of water present in this reaction is adjusted in such a manner that the dispersion of the reactants can properly be stirred. Stirring should be as vigorous as possible in order to increase the speed of reaction. Stirring devices of the grinding or crushing type are not required.

Substances which cause wetting of the reactants are especially suitable catalysts. Not only the known wetting agents but also organic compounds which have a low water-solubility exhibit such a wetting action and are useful catalysts. The amount of catalyst to be added depends upon its composition and upon the type of reactants used. In general 1% to 9%, calculated for solid components of the reaction mixture, are sufficient. Smaller amounts can, of course, also be used and the reaction proceeds also without the addition of the catalyst.

The reaction requires usually ½ hour to 4 hours to be completed. In some instances it may require more time or it may proceed in less than half an hour. After the reaction is completed, the final products are dried, preferably at 70–80° C.

In order to characterize the new compounds, their total lead content, their reactive lead content, i.e. that portion of the lead content which is capable of reacting with hydrochloric acid, their density, and their free fatty acid content are determined. The free fatty acid content serves also as an indication for the completeness of the reaction. When proceeding according to the methods given hereinabove under (a) sub (1) to (5) and under (b) sub (1) and (2) the reaction is considered to be completed as soon as the free fatty acid content has decreased to about 1% or less.

When producing higher basic products, the reaction is considered to be completed as soon as the yellow color of litharge has disappeared and a white product has been formed.

Of the basic lead sulfates to be used as starting materials, tetrabasic lead sulfate (4PbO.PbSO₄) has proved to be the most suitable reactant due to its high reactive lead content. Lower basic lead sulfates, such as, for instance, tribasic lead sulfate may also be used as starting material. The basic lead sulfates are produced according to known methods. They are directly converted into the basic complex lead compounds according to the present invention without any further processing and purification after their preparation. The formula of tetrabasic lead sulfate 4PbO.PbSO₄ leads one to assume that the 4 moles of lead oxide PbO are bound rather loosely and thus, are quite reactive. It was found that said 4 moles of lead oxide can be reacted with 1 mole to 8 moles of monobasic organic acid or with 1 mole to 4 moles of dibasic organic acid. For instance, when using stearic acid, compounds of the general formula $$nPbO.PbSO_4 mPb(C_{17}H_{35}COO)_2$$

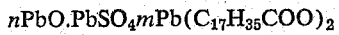

wherein $n$ indicates the numerals 3.5 to 0 and
$m$ the numerals 0.5 to 4.0, are obtained.

Additional lead oxide can be incorporated into such compounds until the coordination number 4 for lead sulfate and the coordination number 3 for lead stearate are completely occupied. The resulting compounds correspond to the following formula $$nPbO.PbSO_4.mPb(C_{17}H_{35}COO)_2$$

wherein $n$ indicates the numerals 4 to 16 and
$m$ the numerals 0.5 to 4.

The tendency of adding more than the stoichiometrical amounts of lead oxide depends on the ability of the used organic acid of forming basic lead compounds. Subsequent incorporation of lead oxide is, for instance, rather difficult when using oleic acid as organic acid component. In this case it is not possible to add as much lead oxide as when using saturated fatty acids.

When using dibasic lead phosphite $$(2PbO.PbHPO_3.½H_2O)$$

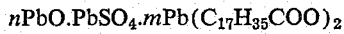

as the inorganic reactant, it can be assumed that 2 moles of lead oxide per each mole of lead phosphite are capable of reacting with the organic acid. It follows that 4 moles of stearic acid are bound. However, it has been found that 5 moles of stearic acid can be reacted with 1 mole of basic lead phosphite. The reaction with the first 4 moles of stearic acid proceeds rather rapidly and the resulting products are characterized by the following formula:

$$nPbO.PbHPO_3.½H_2O.mPb(C_{17}H_{35}COO)_2$$

wherein $n$ indicates the numerals 1.5 to 0 and
$m$ the numerals 0.5 to 2.0.

The theory is advanced, although the invention is not limited to such a theory, that reaction of basic lead phosphite with 5 moles of stearic acid yields a compound of about the following composition:

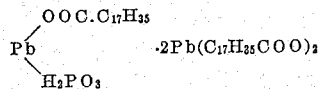

Further amounts of lead oxide can also be incorporated into said product until the coordination number 2 of lead phosphite and the coordination number 3 of lead stearate are completely occupied.

When using basic lead carbonate (white lead) corresponding to the formula $$Pb(OH)_2.2PbCO_3$$

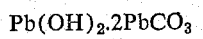

as the inorganic reaction component, it can be assumed that the group Pb(OH)₂ is capable of reacting with 2 moles of stearic acid when employing stearic acid as organic acid reactant. It has been found, however, that the reaction proceeds very smoothly until 4 moles of stearic acid are consumed and that, in addition thereto, reaction with 5 moles to 6 moles of stearic acid is possible. The speed of reaction is relatively uniform until 4 moles of stearic acid are introduced into the molecule. For the introduction of 5 moles of stearic acid a longer reaction time is required, namely 12 hours and for the introduction of 6 moles of stearic acid a reaction time of 30 hours was not even sufficient to achieve complete reaction. The resulting products are illustrated by the following formulas:

With 1 mole of stearic acid:

$$PbOH(C_{17}H_{35}COO).2PbCO_3$$

With 2 moles of stearic acid:

$$Pb(C_{17}H_{35}COO)_2.2PbCO_3$$

With 3 moles of stearic acid:

$$Pb(C_{17}H_{35}COO)_2.2PbCO_3.PbHCO_3(C_{17}H_{35}COO)$$

With 4 moles of stearic acid:

$$Pb(C_{17}H_{35}COO)_2.2PbHCO_3(C_{17}H_{35}COO)$$

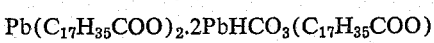

With 5 moles of stearic acid:

$$2Pb(C_{17}H_{35}COO)_2.PbHCO_3(C_{17}H_{35}COO)$$

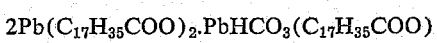

With 6 moles of stearic acid: $3Pb(C_{17}H_{35}COO)_2$.

It is evident that normal lead stearate is obtained when carrying out the reaction to the end. Thus, a method of producing normal lead stearate from white lead and stearic acid has been made available by the present invention.

It is, of course, also possible to introduce additional amounts of lead oxide into the intermediate products prepared from basic lead carbonate and stearic acid.

The following examples serve to illustrate the present invention without, however, limiting the same thereto.

*Example 1*

$$3PbO.PbSO_4.Pb(C_{17}H_{35}COO)_2$$

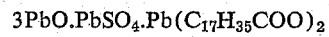

3 g. of triethanolamine stearate are dissolved in 450 cc. of water. 54.4 g. of flaky stearic acid are added thereto at a temperature of 55° C. 119.5 g. of tetrabasic lead sulfate are added portion by portion to the warm dispersion while stirring vigorously. The reaction mixture is stirred for 2½ hours. The resulting white product is filtered off and dried at about 80° C.

Total lead content: 60.2%.

Content of lead capable of reacting with hydrochloric acid: 48.1%.

Density: 2.4.

Example 2

$PbSO_4 \cdot 4Pb(C_{17}H_{35}COO)_2$ 59.8 g. of tetrabasic lead sulfate are dispersed in 400 cc. of water at room temperature, while stirring vigorously. 108.8 g. of molten stearic acid are slowly added to said dispersion. Subsequently the temperature is increased to 55° C. and stirring of the mixture is continued for 6 hours. The resulting white product is filtered off and dried at about 80° C.

Total lead content: 31.4%.
Content of lead capable of reacting with hydrochloric acid: 25.1%.
Density: 1.4.

Example 3

$3.5PbO \cdot PbSO_4 \cdot 0.5Pb(C_{17}H_{33}COO)_2$ 119.5 g. of tetrabasic lead sulfate are dispersed in 400 cc. of water at room temperature while stirring. 27.2 g. of oleic acid are added portion by portion to the dispersion at the same temperature. After half an hour the slightly yellowish product is filtered off and dried at about 70° C.

Total lead content: 71.0%.
Content of lead capable of reacting with hydrochloric acid: 56.8%.
Density: 3.6.

Example 4

$3PbO \cdot PbSO_4 \cdot PbC_4H_8(COO)_2$ 14.6 g. of adipic acid are added to a dispersion of 119.5 g. of tetrabasic lead sulfate in 400 cc. of water. The mixture is stirred at room temperature for half an hour. The resulting white product is filtered off and dried at about 80° C.

Total lead content: 77.8%.
Content of lead capable of reacting with hydrochloric acid: 62.3%.
Density: 3.4.

Example 5

$PbO \cdot PbHPO_3 \cdot 0.5H_2O \cdot Pb(C_{17}H_{35}COO)_2$ 52.4 g. of flaky stearic acid are dispersed at 55° C. in 700 cc. of water with the addition of 0.06 g. of sodium hydroxide while stirring. 74.3 g. of dibasic lead phosphite are added portion by portion to the dispersion. After half an hour the resulting white product is filtered off and is dried at about 80° C.

Total lead content: 48.9%.
Density: 1.9.

Example 6

$PbHPO_3 \cdot 0.5H_2O \cdot 2Pb(C_{17}H_{35}COO)_2$ 54.4 g. of molten stearic acid are slowly added at room temperature to a dispersion of 37.2 g. of dibasic lead phosphite in 400 cc. of water while stirring. Stirring of the reaction mixture at 55° C. is continued for 5½ hours. The resulting white product is filtered off and dried at about 80° C.

Total lead content: 34.6%.
Density: 1.7.

Example 7

$0.5Pb(OH)_2 \cdot 2PbCO_3 \cdot 0.5Pb(C_{17}H_{35}COO)_2$ 77.6 g. of basic lead carbonate are dispersed at room temperature in 400 cc. of water with the addition of 5 cc. of polyethylene glycol (molecular weight 50,000). The temperature is increased to 55° C. and 27.2 g. of flaky stearic acid are added portion by portion to the dispersion. After 1 hour the white product is filtered off and dried at about 80° C.

Total lead content: 59.8%.
Density: 3.1.

In the following tables there are given a number of other basic complex lead salts prepared according to application Serial No. 629,461. These compounds are prepared in the same manner as described hereinabove in the examples whereby the amounts of inorganic basic lead salt, of organic acid and, if desired, of lead oxide which are to be reacted, are given.

TABLE I—REACTION PRODUCTS OF TETRABASIC LEAD SULFATE (a) AND STEARIC ACID (b)

| Example No. | Molar ratio of (a) | Molar ratio of (b) | Formula of Reaction Product | Density | Total lead, Percent | Reactive lead, Percent |
|---|---|---|---|---|---|---|
| 8 | 1 | 1 | $3.5\ PbO \cdot PbSO_4 \cdot 0.5\ Pb(C_{17}H_{35}COO)_2$ | 2.6 | 71.0 | 56.8 |
| 9 | 1 | 2 | $3\ PbO \cdot PbSO_4 \cdot Pb(C_{17}H_{35}COO)_2$ | 2.4 | 60.2 | 48.1 |
| 10 | 1 | 3 | $2.5\ PbO \cdot PbSO_4 \cdot 1.5\ Pb(C_{17}H_{35}COO)_2$ | 2.0 | 52.2 | 41.7 |
| 11 | 1 | 4 | $2\ PbO \cdot PbSO_4 \cdot 2\ Pb(C_{17}H_{35}COO)_2$ | 1.8 | 46.2 | 36.8 |
| 12 | 1 | 5 | $1.5\ PbO \cdot PbSO_4 \cdot 2.5\ Pb(C_{17}H_{35}COO)_2$ | 1.5 | 41.3 | 33.0 |
| 13 | 1 | 6 | $PbO \cdot PbSO_4 \cdot 3\ Pb(C_{17}H_{35}COO)_2$ | 1.4 | 37.3 | 29.9 |
| 14 | 1 | 7 | $0.5\ PbO \cdot PbSO_4 \cdot 3.5\ Pb(C_{17}H_{35}COO)_2$ | 1.4 | 34.3 | 27.3 |
| 15 | 1 | 8 | $PbSO_4 \cdot 4\ Pb(C_{17}H_{35}COO)_2$ | 1.4 | 31.4 | 25.1 |

TABLE II—REACTION PRODUCTS OF TETRABASIC LEAD SULFATE (a) AND VARIOUS ACIDS (c–i)[1]

| Example No. | Molar ratio of (a) | Molar ratio of (c–i)[1] | Formula of Reaction Product | Density | Total lead, Percent | Reactive lead, Percent |
|---|---|---|---|---|---|---|
| 16 | 1 | (c)1 | $3.5\ PbO \cdot PbSO_4 \cdot 0.5\ Pb(C_{17}H_{33}COO)_2$ | 3.6 | 71.0 | 56.8 |
| 17 | 1 | (d)1 | $3.5\ PbO \cdot PbSO_4 \cdot 0.5\ Pb(C_{17}H_{31}COO)_2$ | 4.0 | 71.0 | 56.8 |
| 18 | 1 | (e)1 | $3.5\ PbO \cdot PbSO_4 \cdot 0.5\ Pb(C_7H_{15}COO)_2$ | 3.7 | 77.8 | 62.3 |
| 19 | 1 | (f)1 | $3\ PbO \cdot PbSO_4 \cdot PbC_4H_8(COO)_2$ | 3.4 | 77.8 | 62.3 |
| 20 | 1 | (g)1 | $3.5\ PbO \cdot PbSO_4 \cdot 0.5\ Pb(C_6H_5COO)_2$ | 4.9 | 79.2 | 62.5 |
| 21 | 1 | (h)1 | $3\ PbO \cdot PbSO_4 \cdot PbC_6H_4(COO)_2$ | 4.4 | 76.6 | 61.3 |
| 22 | 1 | (i)1 | $3.5\ PbO \cdot PbSO_4 \cdot 0.5\ Pb(C_{11}H_{23}COO)_2$ | 3.7 | 74.8 | 59.8 |
| 23 | 1 | (i)8 | $PbSO_4 \cdot 4\ Pb(C_{11}H_{23}COO)_2$ | 1.5 | 38.0 | 30.4 |

[1] The letters (c–i) as used in the preceding Table II indicate the following acids: (c)=oleic acid; (d)=linoleic acid; (e)=α-ethyl hexanoic acid; (f)=adipic acid; (g)=benzoic acid; (h)=phthalic acid; (i)=lauric acid.

TABLE III—REACTION PRODUCT OF DIBASIC LEAD PHOSPHITE (j) AND STEARIC ACID (b)

| Example No. | Molar ratio of— | | Formula of Reaction Product | Density | Total lead, Percent |
|---|---|---|---|---|---|
| | (j) | (b) | | | |
| 24 | 1 | 1 | $1.5\ PbO.PbHPO_3.0.5\ H_2O.0.5\ Pb(C_{17}H_{35}COO)_2$ | 2.6 | 61.8 |
| 25 | 1 | 2 | $PbO.PbHPO_3.0.5\ H_2O.Pb(C_{17}H_{35}COO)_2$ | 1.9 | 48.9 |
| 26 | 1 | 3 | $0.5\ PbO-PbHPO_3.0.5\ H_2O.1.5\ Pb(C_{17}H_{35}COO)_2$ | 1.8 | 40.5 |
| 27 | 1 | 4 | $PbHPO_3.0.5\ H_2O.2\ Pb(C_{17}H_{35}COO)_2$ | 1.7 | 34.6 |
| 28 | 1 | 5 | $PbH_2PO_3(C_{17}H_{35}COO).0.5\ H_2O.2\ Pb(C_{17}H_{35}COO)_2$ | 1.6 | 30.2 |

TABLE IV—REACTION PRODUCT OF BASIC LEAD CARBONATE (k) AND STEARIC ACID (b)

| Example No. | Molar ratio of— | | Formula of Reaction Product | Density | Total lead, percent |
|---|---|---|---|---|---|
| | (k) | (b) | | | |
| 29 | 1 | 1 | $0.5\ Pb(OH)_2.2\ PbCO_3.0.5\ Pb(C_{17}H_{35}COO)_2$ | 3.1 | 59.8 |
| 30 | 1 | 2 | $2\ PbCO_3.Pb(C_{17}H_{35}COO)_2$ | 1.8 | 47.6 |
| 31 | 1 | 3 | $PbCO_3.PbHCO_3(C_{17}H_{35}COO).Pb(C_{17}H_{35}COO)_2$ | 1.8 | 39.6 |
| 32 | 1 | 4 | $2\ PbHCO_3(C_{17}H_{35}COO).Pb(C_{17}H_{35}COO)_2$ | 1.7 | 34.0 |
| 33 | 1 | 5 | $PbHCO_3(C_{17}H_{35}COO).2\ Pb(C_{17}H_{35}COO)_2$ | 1.6 | 29.7 |

TABLE V—REACTION PRODUCT OF TETRABASIC LEAD SULFATE (a), STEARIC ACID (b), AND LEAD OXIDE (l)

| Example No. | Molar ratio of— | | | Formula of Reaction Product | Density | Total lead, percent | Reactive lead, percent |
|---|---|---|---|---|---|---|---|
| | (a) | (b) | (l) | | | | |
| 34 | 1 | 1 | 1 | $4.5\ PbO.PbSO_4.0.5\ Pb(C_{17}H_{35}COO)_2$ | 3.4 | 73.9 | 61.5 |
| 35 | 1 | 1 | 1.5 | $5\ PbO.PbSO_4.0.5\ Pb(C_{17}H_{35}COO)_2$ | 3.6 | 75.0 | 63.5 |
| 36 | 1 | 1 | 2 | $5.5\ PbO.PbSO_4.0.5\ Pb(C_{17}H_{35}COO)_2$ | 4.3 | 76.1 | 65.3 |
| 37 | 1 | 2 | 4 | $7\ PbO.PbSO_4.Pb(C_{17}H_{35}COO)_2$ | 3.1 | 71.4 | 63.4 |
| 38 | 1 | 8 | 12 | $12\ PbO.PbSO_4.4\ Pb(C_{17}H_{35}COO)_2$ | 2.0 | 58.9 | 55.4 |
| 39 | 1 | 8 | 13 | $13\ PbO.PbSO_4.4\ Pb(C_{17}H_{35}COO)_2$ | 2.4 | 60.0 | 56.7 |
| 40 | 1 | 8 | 14 | $14\ PbO.PbSO_4.4\ Pb(C_{17}H_{35}COO)_2$ | 2.5 | 61.2 | 58.0 |
| 41 | 1 | 8 | 15 | $15\ PbO.PbSO_4.4\ Pb(C_{17}H_{35}COO)_2$ | 2.6 | 62.2 | 59.0 |
| 42 | 1 | 8 | 16 | $16\ PbO.PbSO_4.4\ Pb(C_{17}H_{35}COO)_2$ | 2.9 | 63.2 | 60.3 |
| 43 | 1 | *8 | 12 | $12\ PbO.PbSO_4.4\ Pb(C_{11}H_{23}COO)_2$ | 2.6 | 64.7 | 61.0 |

*Lauric acid.

TABLE VI—REACTION PRODUCT OF TETRABASIC LEAD SULFATE (a), STEARIC ACID (b), ANOTHER ORGANIC ACID (c, g, h, and (m¹), AND LEAD OXIDE (l)

| Example No. | Molar ration of (c), (a), (b), (g), (h), (m¹), (e) | | | Formula of Reaction Product | Density | Total lead, percent | Reactive lead, percent |
|---|---|---|---|---|---|---|---|
| 44 | 1 | 1.5 | 0.5 (h) | 4 (l) | $6.75\ PbO.PbSO_4\ 0.75\ Pb(C_{17}H_{35}COO)_2.0.5\ PbC_6H_4(COO)_2$ | 3.4 | 73.2 | 65.0 |
| 45 | 1 | 1.5 | 0.5 (g) | 4 (l) | $7\ PbO.PbSO_4.0.75\ Pb(C_{17}H_{35}COO)_2.0.25\ Pb(C_6H_5COO)_2$ | 3.6 | 73.5 | 65.3 |
| 46 | 1 | 1.5 | 0.5 (m) | 4 (l) | $7\ PbO.PbSO_4.0.75\ Pb(C_{17}H_{35}COO)_2.0.25\ Pb(C_6H_4OH.COO)_2$ | 3.6 | 73.8 | 65.5 |
| 47 | 1 | 1.5 | 0.5 (c) | 4 (l) | $7\ PbO.PbSO_4.0.75\ Pb(C_{17}H_{35}COO)_2.0.25\ Pb(C_{17}H_{35}COO)_2$ | 3.1 | 71.3 | 63.4 |

¹ The letter (m) used in the preceding Table VI indicates salicylic acid.

TABLE VII—REACTION PRODUCT OF DIBASIC LEAD PHOPHITE (j), STEARIC ACID (b), AND LEAD OXIDE (l)

| Example No. | Molar ratio of— | | | Formula of Reaction product | Density | Total lead, percent | Reactive lead, percent |
|---|---|---|---|---|---|---|---|
| | (j) | (b) | (l) | | | | |
| 48 | 1 | 2 | 1 | $2\ PbO.PbHPO_3.Pb(C_{17}H_{35}COO)_2$ | 2.2 | 54.4 | 40.7 |
| 49 | 1 | 2 | 2 | $3\ PbO.PbHPO_3.Pb(C_{17}H_{35}COO)_2$ | 2.4 | 59.3 | 47.4 |
| 50 | 1 | 2 | 3 | $4\ PbO.PbHPO_3.Pb(C_{17}H_{35}COO)_2$ | 2.7 | 63.2 | 52.6 |
| 51 | 1 | 2 | 4 | $5\ PbO.PbHPO_3.Pb(C_{17}H_{35}COO)_2$ | 2.9 | 66.2 | 56.7 |
| 52 | 1 | 4 | 7 | $7\ PbO.PbHPO_3.2\ Pb(C_{17}H_{35}COO)_2$ | 2.9 | 61.1 | 55.0 |

TABLE VIII—REACTION PRODUCT OF BASIC LEAD CARBONATE (k), STEARIC ACID (b), AND LEAD OXIDE (l)

| Example No. | Molar ratio of— | | | Formula of Reaction Product | Density | Total lead, percent |
|---|---|---|---|---|---|---|
| | (k) | (b) | (l) | | | |
| 53 | 1 | 1 | 1 | $0.5\ PbO.Pb(OH)_2.2PbCO_3\ 0.5\ Pb(C_{17}H_{35}COO)_2$ | 3.1 | 65.5 |
| 54 | 1 | 4 | 1 | $2\ PbCO_3.2\ Pb(C_{17}H_{35}COO)_2$ | 3.0 | 40.4 |
| 55 | 1 | 4 | 2 | $PbO.2\ PbCO_3.2\ Pb(C_{17}H_{35}COO)_2$ | 2.1 | 45.6 |
| 56 | 1 | 4 | 3 | $2\ PbO.2\ PbCO_3.2\ Pb(C_{17}H_{35}COO)_2$ | 2.1 | 49.8 |
| 57 | 1 | 4 | 4 | $3\ PbO.2\ PbCO_3.2\ Pb(C_{17}H_{35}COO)_2$ | 2.3 | 53.3 |
| 58 | 1 | 4 | 5 | $4\ PbO.2\ PbCO_3.2\ Pb(C_{17}H_{35}COO)_2$ | 2.4 | 56.2 |

In place of triethanolamine stearate used as catalyst in Example 1 or of sodium stearate used as catalyst in Example 5, or of polyethylene glycol used as catalyst in Example 7, there may be employed other catalysts which cause wetting of the reactants, for instance, aliphatic monohydric and polyhydric alcohols, such as isopropanol, glycerol; aromatic monohydric alcohols, such as benzyl alcohol; sulfonates of fatty alcohols.

As shown in Example 5, the catalyst may be formed in the reaction mixture by the addition of agents capable of combining with each other to form the desired wetting agent.

Of course, many changes and variations in the reactants, the inorganic basic lead salts, the organic mono- or dibasic acids, the catalytically acting wetting agent, in the reaction conditions, temperature, and duration, in the amounts of lead oxide added additionally to the reaction mixture, in the concentration and molar ratio of the reactants in the aqueous dispersions and/or solutions, in the method of removing the resulting basic complex lead salts from the reaction mixture and of drying them, and the like may be made by those skilled in the art in accordance with the principles set forth herein and in the claims annexed hereto.

The new basic complex lead salts according to the present invention have a remarkable stabilizing effect upon plastics of the polyvinyl chloride type and of copolymerization products containing such polyvinyl chlorides such as copolymerization products of vinyl chloride with vinyl acetate, vinylidene chloride, acrylonitrile, vinyl propionate, vinyl butyrate, vinyl chloro acetate, ethyl methacrylate, and others.

The amount of stabilizing basic complex lead salts according to the present invention admixed to the plastic composition is preferably between about 0.5% by weight and about 10% by weight of the amount of halogen-containing plastic, and especially of polyvinyl chloride employed. Especially advantageous results are achieved when admixing between about 2% by weight and about 3% by weight of the basic complex lead salt to the plastic composition.

The stabilizing effect of the new basic complex lead compounds according to the present invention is far superior to the stabilizing effect achieved by other basic inorganic lead compounds as they are conventionally used as stabilizing agents. The stabilizing effect is especially evident when testing the respective compositions for their heat stability and their specific electrical resistivity.

The following examples show compositions according to the present invention as they are used for coating and painting, for making films and foils or plastic articles, and for other purposes without, however, being limited thereto.

Example 59

The following table lists several of the stabilizers of the invention together with their stabilizing characteristics, their lubricity and their specific electrical resistivity.

The starting materials of the test composition were taken from the same batch for all test films. The test composition consisted of

| | Parts |
|---|---|
| Suspension polyvinyl chloride, trademark "Vestolit S 70" | 100 |
| Dioctylphthalate, trademark "Vestinol AH spez." | 50 |
| Stabilizer | 2 |

The components of the composition were mixed for 10 minutes at 170° C. on a roll mill and subsequently drawn out to a film which was subjected to a thermal treatment at 180° C. in a furnace. The end of the stabilizing action was expressed in terms of the time elapsed until the first brown spots were observed.

The electrical specific resistivity was determined in accordance with DIN 53482 on the films obtained on the roll mill.

INORGANIC-ORGANIC LEAD COMPLEXES

| Stab. of Ex. No. | Molar ratio of starting materials | Lead content | Density | Beginning of discoloration to brown, minutes | End of lubricating action, minutes | $\rho_D$, $10^{14}$ ohms.cm |
|---|---|---|---|---|---|---|
| 39 | 4 PbO.PbSO$_4$:stearic acid=1:1 | 71 | 2.6 | 45 | 27–35 | 7.8 |
| 45 | 4 PbO.PbSO$_4$:lead oxide:stearic acid:benzoic acid=1:4:1.5:0.5 | 73.5 | 3.6 | 90 | 37–42 | 6.6 |
| 50 | Dibasic lead phosphite:PbO:stearic acid=1:3:2 | 64.4 | 2.7 | 90 | 40–45 | 3.5 |

We claim:
1. A surface coating composition comprising a film forming vehicle selected from the group consisting of a vinylchloride homopolymer and copolymer and the complex lead compound of the formula

$$n\text{Pbo.PbAc}_1.m\text{Pb}(\text{Ac}_2)_x$$

wherein $n$ indicates the numerals 0 to 16;

$m$ indicates the numerals 0.5 to 4;

$\text{Ac}_1$ indicates the dibasic inorganic acid residue selected from the group consisting of the sulfate group >SO$_4$, the carbonate group >CO$_3$, and the phosphite group >HPO$_3$;

$\text{Ac}_2$ indicates an organic acid residue selected from the group consisting of the residue of a saturated monobasic aliphatic acid, an unsaturated monobasic aliphatic acid, a saturated dibasic aliphatic acid, an unsaturated dibasic aliphatic acid, a monobasic aromatic acid, and a dibasic aromatic acid; and $x$ indicates the numeral 1 when $\text{Ac}_2$ is the residue of a dibasic organic acid, and the numeral 2 when $\text{Ac}_2$ is the residue of a monobasic organic acid, said complex lead compound being present in said composition in an amount between about 0.5%, by weight, and about 10%, by weight, of the film forming vehicle.

2. The surface coating composition according to claim 1, wherein the film forming vehicle is polyvinylchloride.

3. The surface coating composition according to claim 1, wherein the complex lead compound is present in said composition in an amount between about 2%, by weight, and about 3%, by weight, of the halogen containing vinyl plastic.

References Cited by the Examiner

UNITED STATES PATENTS 3,072,693  1/1963  Szczepanek _____ 260—435

MORRIS LIEBMAN, *Primary Examiner.*

ALEXANDER H. BRODMERKEL, *Examiner.*

K. B. CLARKE, A. KOECKERT, *Assistant Examiners.*